United States Patent [19]
Anderson et al.

[11] Patent Number: 6,108,787
[45] Date of Patent: Aug. 22, 2000

[54] METHOD AND MEANS FOR INTERCONNECTING DIFFERENT SECURITY LEVEL NETWORKS

[75] Inventors: Mark Stephen Anderson; John Edmund Griffin; Christopher James Guildford North; John Desborough Yesberg; Kenneth Kwok-Hei Yiu; Robert Brunyee Milner, all of Salisbury, Australia

[73] Assignee: The Commonwealth of Australia, Australia

[21] Appl. No.: 08/930,374

[22] PCT Filed: Mar. 29, 1996

[86] PCT No.: PCT/AU96/00186

§ 371 Date: Dec. 8, 1997

§ 102(e) Date: Dec. 8, 1997

[87] PCT Pub. No.: WO96/30840

PCT Pub. Date: Oct. 3, 1996

[30] Foreign Application Priority Data

Mar. 31, 1995 [AU] Australia ................ PN2081
Aug. 1, 1995 [AU] Australia ................ PN4559

[51] Int. Cl.[7] ................................ G06F 11/00
[52] U.S. Cl. ........................ 713/201; 709/249
[58] Field of Search ................ 713/201, 200, 713/202; 714/13; 330/25; 364/200; 375/7; 379/95; 370/3; 380/30; 712/43; 709/203, 217, 218, 219, 223, 224, 225, 227, 228, 229, 249, 250, 251, 252, 253

[56] References Cited

U.S. PATENT DOCUMENTS

| | | | |
|---|---|---|---|
| 4,685,113 | 8/1987 | Hono et al. | 375/7 |
| 4,713,753 | 12/1987 | Boebert et al. | 364/200 |
| 4,799,153 | 1/1989 | Hann et al. | 364/200 |
| 4,888,801 | 12/1989 | Foster et al. | 380/21 |
| 5,023,907 | 6/1991 | Johnson et al. | 380/4 |
| 5,142,565 | 8/1992 | Ruddle | 379/95 |
| 5,191,611 | 3/1993 | Lang | 380/25 |
| 5,272,754 | 12/1993 | Boerbert | 380/25 |
| 5,276,735 | 1/1994 | Boebert et al. | 380/21 |
| 5,291,596 | 3/1994 | Mita | 395/600 |
| 5,369,707 | 11/1994 | Fellendore, III | 380/25 |
| 5,387,899 | 2/1995 | Dilauro et al. | 340/514 |
| 5,416,842 | 5/1995 | Aziz | 380/30 |
| 5,596,718 | 1/1997 | Boebert et al. | 713/201 |
| 5,623,601 | 4/1997 | Vu | 713/201 |
| 5,636,341 | 6/1997 | Matsushita et al. | 714/13 |
| 5,805,674 | 8/1998 | Anderson, Jr. | 379/93.03 |

FOREIGN PATENT DOCUMENTS

| | | | |
|---|---|---|---|
| 663406 | 1/1994 | Australia | G06F 12/14 |
| 95-038599 | 2/1995 | Japan | G06F 13/00 |
| 95-200433 | 8/1995 | Japan | G06F 13/00 |

*Primary Examiner*—Joseph E. Palys
*Assistant Examiner*—Rijue Mai
*Attorney, Agent, or Firm*—Baker & Maxham

[57] ABSTRACT

An information flow control means for location between a first and second computer network where the first network has a higher security classification than the second network. The information flow control means comprises an information switch having an information input, a first output connected to the first network, a second output connected to the second network, a controller having at least two states, a first state controlling the information switch to connect the input to the first output and a second state controlling the information switch to connect the input to the second output, and an information diode having an input for receiving information from the second network and an output for transferring information received from the second network to the first network through a connection from the information diode output to the first network and which prevents information flowing from the output to the input.

73 Claims, 9 Drawing Sheets

METHOD AND MEANS FOR INTERCONNECTING DIFFERENT SECURITY LEVEL NETWORKS

FIELD OF THE INVENTION

This invention relates to the selective input and output of information data between computer networks having different levels of security classification.

BACKGROUND

Those persons responsible for computers and computer networks are becoming increasingly concerned about computer data security.

In some computing environments physical isolation of networks provides the greatest level of security for each network. An example of this is Department of Defence networks which are typically physically isolated from all other networks classified at a lower level.

However, there will always be good reason to have connections between networks, and at least in a defence environment it may be necessary to have a console or workstation used in an isolated network which can exchange information with another network which is less classified. There are also examples of this in the commercial world where companies dealing with commercially sensitive information also require one or more consoles or workstations in their network to be connected to industry LANS and WANS and increasingly with the Internet.

It is generally accepted that if networks of different classification are allowed to be connected, flow of information from a computer working in a lower classified network to a computer working in the higher classified network is allowed. It is flow from the higher classified network to the lower classified network which requires restrictions. A well-known example of such a policy is the Bell & La Padula security policy.

Figure 2:
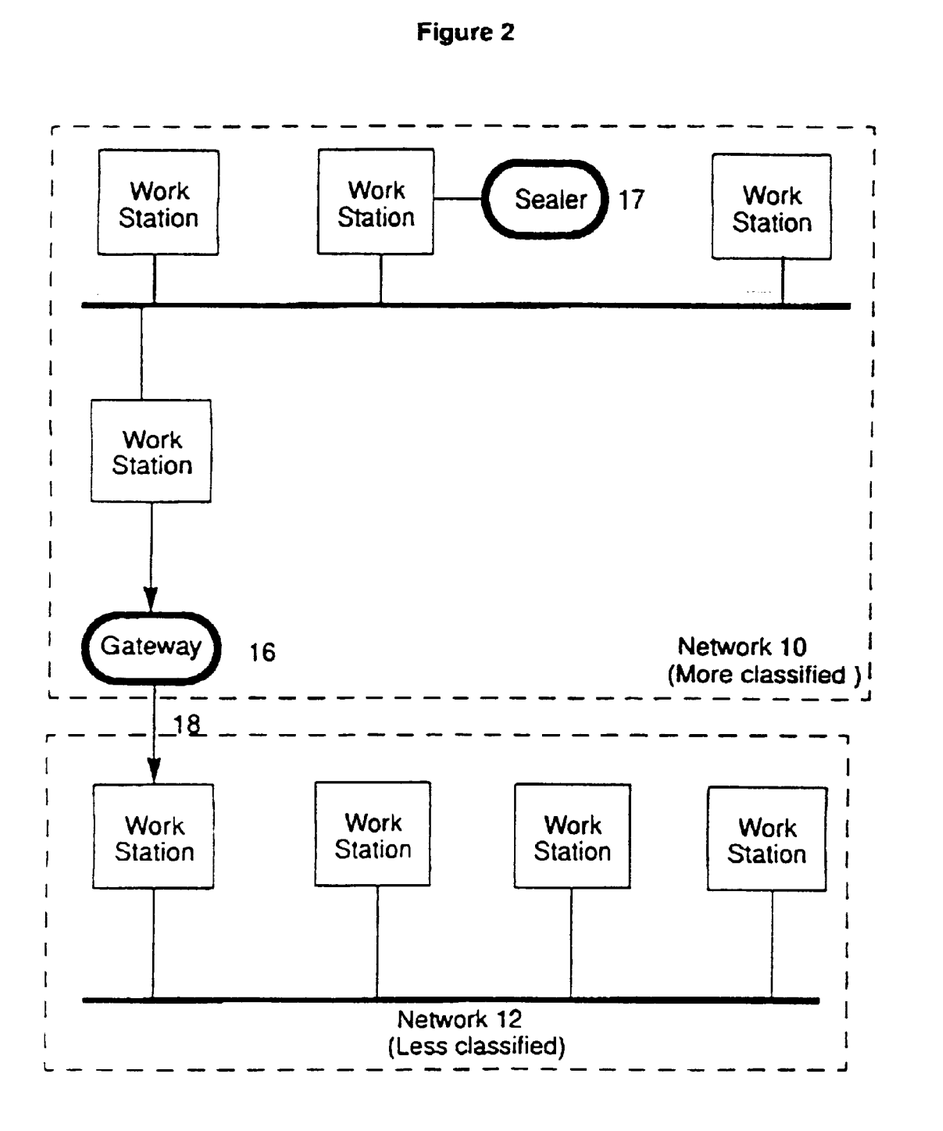
FIG. 2 depicts a data information filter fitted between two computer networks.

One such arrangement is depicted in FIG. 2, where information transfer from a higher classified network to a lower classified network is only permitted by the arrangement if an authorised sender applies a unique seal to the information. A gateway device located at the junction point of the lower and higher classified networks only allows properly sealed information to pass to the lower classified network. The gateway ensures that the seal is legitimate and audits the information transfer.

This approach has many disadvantages which largely affect the ease of use and cost of such a network which typically require expensive custom workstations or additional trusted elements which can seal and if necessary encrypt the information and/or seal.

This invention eliminates or reduces these problems and can in certain circumstances work with this arrangement.

It is also not unreasonable for users of a higher classified network to want access to lower classified networks to upload information or remotely login to the other network and use the facilities available on that lower classified network such as for example the Internet. This type of use involves the user of the higher classified network typing commands on their normal workstation which then displays information obtained from the lower classified network.

Australian Patent No AU 663406 to Secure Computing Corporation discloses a method and apparatus for ensuring secure communications over an unsecured communications medium between a user working on an unsecured workstation and a remote host computer. A secure user interface is created by inserting a trusted path subsystem between input/output devices to the workstation and the workstation itself. This patent however has a number of critical differences of approach to that of the subject invention.

Most importantly the secure user interface of AU 663406 must use a cryptographic entity located in the user interface to encrypt and decrypt all information passing through the interface. The secure user interface does not allow the free flow of information from the network having a lower security to the network having a higher security. The remote host computer must have a trusted subsystem and a cryptographic entity having corresponding encryption and decryption facilities to that in the secure user interface. The secure user interface must have a video manager which creates a "trusted" window generated by a video RAM which always processes information which has been decrypted in the secure user interface.

As will be described in this specification much greater ease of use, simpler design and avoidance of cryptographic entities can be achieved with a different approach to dealing with information being input by a user or computer device and with information sourced from the lower classified network.

The inventors recognised that the junction point of the two or more networks having different security levels can exist at one and/or more selected workstations or computer information processing devices located either in the higher classified network or external to it and that by allowing the flow of information from the lower classified network to the higher classified, networks can thus be connected relatively easily. The invention can assure the user entering (by way of typing for example) higher classified information, that information is being input to the higher classified network and no other and furthermore that the lower classified network is not able to down load information from the higher classified network at any time.

SUMMARY OF THE INVENTION

In broad aspect of the invention a means to control information flow between a first and second computer network where the first network has a higher security classification than the second network, comprises
  an information switch having
    an information input,
    a first output connected to said first network,
    a second output connected to said second network,
  a controller having at least two states a first state controlling said information switch to connect said input to said first output and a second state controlling said information switch to connect said input to said second output, and
  an information diode having an input for receiving information from said second network and an output for transferring information received from said second network to said first network through a connection from said information diode output to said first network and which prevents information flowing from said output to said input.

In a yet further broad aspect of the invention a means to control information flow between a first and second computer network where the first network has a higher security classification than the second network and said first network having at least one information processing means therein, said flow control means comprises
  an information switch having
    an information input, a first output connected to a said at least one information processing means within said first network, a second output connected to said second network, a controller having at least two states a first state controlling said information switch to connect said input to said first output and a second state controlling said information switch to connect said input to said second output, and an information diode having an input for receiving information from said second network and an output for transferring information from said second network to said first network through a connection from said information diode output to said first network and which prevents information flowing from said output to said input.

In a yet further broad aspect of the invention a means to control information flow between a first and second computer network where the first network has a higher security classification than the second network and at least one information processing means not within either said first or second network, the flow control means comprises an information switch having
an information input,
and at least three outputs,
a first output connected to said first network,
a second output connected to said second network,
a third output connected to said information processing means, a controller having at least three states, a first state controlling said information switch to connect said input to said first output, a second state controlling said information switch to connect said input to said second output, and a third state controlling said information switch to connect said input to said third output, and an information diode having an input for receiving information from said second network and an output for transferring information from said second network to said first network and/or to said information processing means.

In a further aspect of the invention the controller is in said first state unless it forced into the second state.

In a further aspect of the invention the information flow control further comprises an indicator means for indicating the state of said controller to a user of the information flow control means.

In yet a further aspect of the invention the information switch further comprises at least one further output connected to a respective further network and said controller having further states for controlling said information switch to connect said input to a respective further output.

In a further aspect of the information flow control means the information output from said second output is provided to said first network which further comprises an information sealing means for associating an unique seal with said information output from said second output.

In a further aspect of the invention an information flow control means wherein said first network has an information processing means operating a high side client display application, and said second network has an information processing means operating as an application server and using a remote display protocol, whereby remote display commands are communicated to said first network information processing means through said information diode, such that when said information switch controller is in said second state, said information input is connected to said low side application server which communicates with said high side client display application through said information diode.

In a further aspect of the invention an information flow control means wherein a first network has a high side X server and a high side imitation X client, and a second network has a low side imitation X server and a low side X client such that when said information switch controller is in said second state, said information input is connected to said low side imitation X server which communicates with said low side client and with said high side imitation X client through said information diode; and said low side X client send information to both said low side imitation X server and said high side imitation X client and said high side X server through said information diode which both then communicate each other to provide a secure X environment for information received by said input.

Embodiments of the invention will now be described in some further detail with reference to and as illustrated in the accompanying figures. These embodiments are illustrative, and not restrictive of the scope of the invention.

DETAILED DESCRIPTION OF A PREFERRED EMBODIMENT OF THE INVENTION

Figure 1:
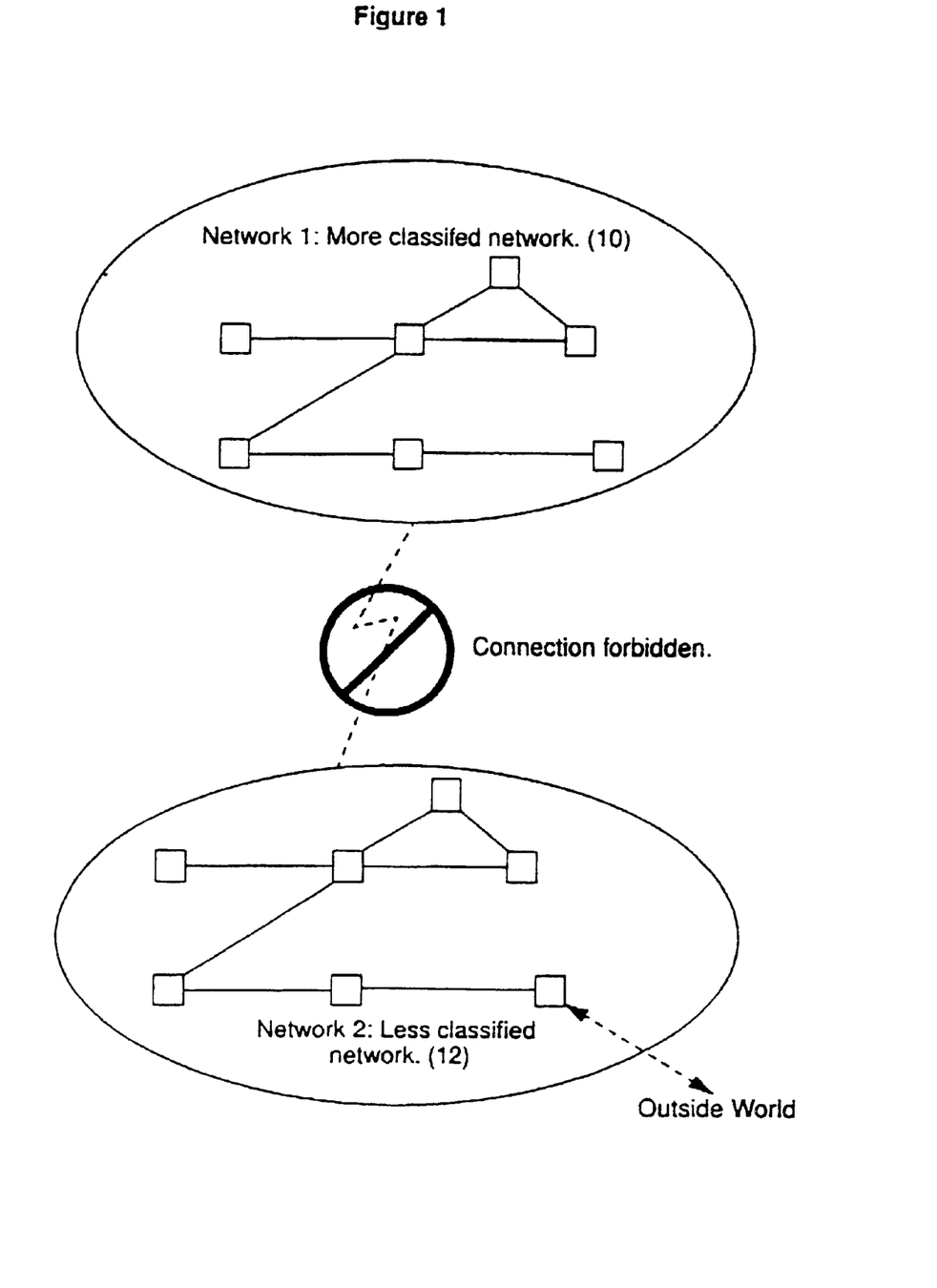
FIG. 1 depicts two physically isolated computer networks.

FIG. 1 depicts a computer network 10 which stores and manages information which has a higher classification than the further computer network 12 which contains and manages less classified information. For example network 10 may contain top secret information and network 12 may contain unclassified information. Both networks operate independently of each other and are not connected in any way that would enable information to flow between them. This is the most secure manner in which networks having disparate security level information thereon should be operated. It should be noted that reference to more and less classified information is only an example and that the difference between the information may be more and less sensitivity to public or commercial revelation.

However there are many good reasons for allowing exchange of information between users at their workstations in respective networks. It is generally accepted that information may be allowed to flow from the less classified network (eg an unclassified security level network) to a more classified network (eg top secret security level network).

Other network security arrangements exist which require the use of trusted hardware and software to enable information to flow from the higher classified network to the lower classified network. By design, the network operations and workstations therein ensure a predetermined level of security functionality for particular elements whether they work within the more classified or less classified network. However these security enforcing elements both restrict the types of information that may be processed or transferred and are extremely costly to manufacture and use.

FIG. 2 pictorially represents two computer networks 10 and 12 being more classified and less classified respectively. Network 10 has an information filter device 16 (gateway) connecting the more classified network 10 to the less classified computer network 12. The information filter 16 is configured so as to allow the flow of information from the classified network to the unclassified network only under certain conditions and no flow of information is provided from the less classified network 12 to the more classified network 10.

Those conditions have been described previously and in one example the filter can be made to ensure that only information which has been properly sealed by a trusted sealer 17 is passed from network 10 via the trusted filter 16 to network 12. A seal will be understood by those skilled in the art as being an element of an information object that can be used to uniquely identify that information object and is in fact defined by the content of that information object. A digital signature will also be understood by those skilled in the art to comprise an information object that can be used to uniquely identify that information object and zero or more additional information elements, thus it can be considered to be a seal plus zero or more information elements that may themselves be a user ID, a workstation ID, a network ID or combinations of them. The use of digital signatures will be demonstrated in this specification.

Figure 3:
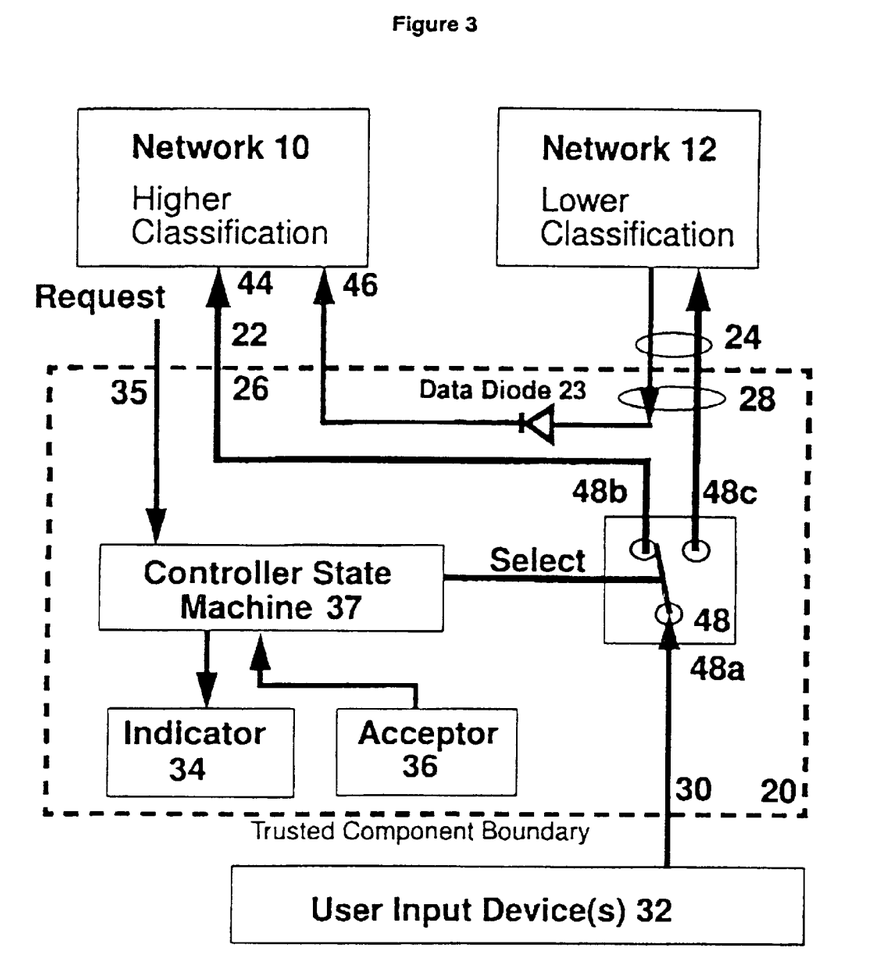
FIG. 3 depicts a functional block diagram of the invention for controlling the flow of information between two networks of different security classification.

FIG. 3 depicts a functional block diagram of an embodiment of the invention comprising an information switch means 20, designed to allow the flow of information from, for example, a higher classified network workstation's keyboard (input device 32) to a lower classified network 12. In this regard the earlier assumption that the operator is trustworthy still applies. However it is of critical importance to an operator (user) to know when information being input (eg information being typed on their keyboard) is going direct to the lower classified network 12, and also importantly, the user must be confident that at all other times information being input from the keyboard or other input device will only be transferred to an associated information processing means which is typically a workstation within the higher classified network (10) and no other thus assuring the user that the information being input to the information switch means 20 is being received by the higher classified network and no other.

It is also a feature of the invention to provide an indicator means which unambiguously indicates to the user exactly when information being input by the user on the input device 32 is being transferred to the less classified network and also when it is being transferred to the higher classified network via for example the associated workstation. Adequate and trusted indication would alleviate the need for physical isolation of the networks or the use of trusted seals and data filters. The use of workstations is widespread amongst network users but any general or even special purpose information processing means is applicable to the circumstances described.

FIG. 3 depicts the two isolated networks 10 and 12 being higher classified and lower classified respectively. The information switch means 20 is located between a connection 22 from the more classified network to the switch means 20 and a further connection 24 between the switch means 20 and the less classified network 12.

Connection 22 is provided at port 26 of the switch means 20 and connection 24 is provided at port 28 of the switch means 20.

In one embodiment, connection 24 is directly connected to the lower classified network 12.

In yet a further embodiment, the output provided through port 28 is provided to connection 24 which for a portion of the transport medium may be a part of the higher classified network 10.

In a further example when information is provided directly from the higher classified network and the information switch means is arranged to connect the higher to the lower network, output provided through port 28 can only leave the higher classified network 10 which lies beyond port 28 if it has been modified in the appropriate trusted manner, preferably sealed, and may then only be released from the network by passing through a trusted gateway. FIG. 2 depicts a higher classified network which uses a sealer 17 and a gateway 16 to control the type of information released from the network.

In a further example a gateway may only transfer information which has been digitally signed by an authorised user. Alternatively, the output from port 26 may need to leave the higher classified network only after it has been modified in the appropriate trusted manner so that after being processed by an application in the lower classified network it can complete the information flow circuit and be used to provide for example relevant display commands to the higher classified network information processing means via the one way information diode 23 which is located between the networks but not necessarily adjacent the information switch means.

A further port 30 connects the switch means 20 to an information input device 32 which in this embodiment comprises a keyboard but which may also be a pointing device (mouse or a keyboard and mouse combination), a scanner, or any other form of information input device suitable for the task at hand.

A switch 48 comprises a first input 48a connected to port 30 for receiving input signals from the user input device 32. The switch 48 also has two outputs 48b and 48c which are connected to ports 26 and 28 respectively. The state of the switch 48 is controlled by a controller, in this embodiment a state machine 37, which determines whether the first input 48 connects port 30 to either of ports 26 or 28.

Figure 4:
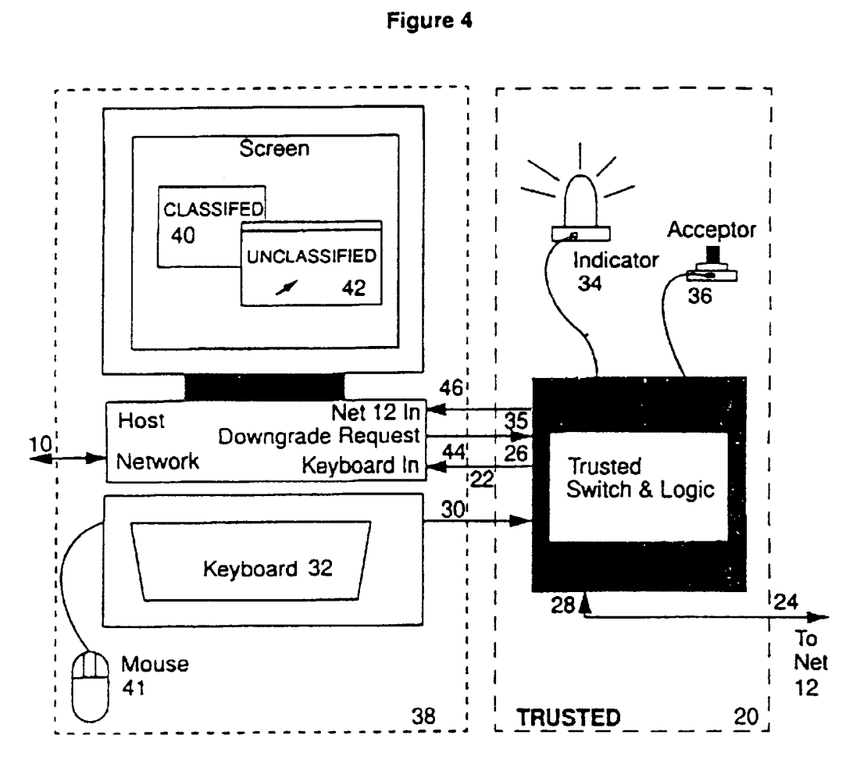
FIG. 4 depicts a pictorial representation of the invention associated with a workstation.

In FIG. 4 an indicator means 34 is shown associated with the information switch means 20 and comprises, in this example, a lamp which alights to provide a visual indication to the user of the state of the information switch means 20. The indicator means however may alternatively comprise an audio signal generation device or a tactile signal indication device again adapted to suit the circumstances of the use or it may even comprise combinations thereof.

Furthermore the indicator device 34 may in a further embodiment be located remote of the information switch means 20. However, not unlike the risk of connections to the networks being swapped it would be recognised by those skilled in the art that this alternative indication arrangement would be less trusted, since it would increase the probability that the indication signals provided were not authentic as there is a possibility of inadvertent or malicious changes to the correct operation of the indicator device.

The information switch means 20 is also depicted with an actuation acceptor device. In this example, a momentary contact switch 36 the principle of which will be described in greater detail later in this specification.

In one embodiment the information switch means may be controlled to redirect data flow by an input signal generated by the user's workstation. This workstation is typically in network 10, therefore this input signal may be regarded as a request to "downgrade" data. This downgrade signal may comprise for example a high-to-low digital level transition received on a dedicated input port 35 of the controller 37 of the information switch means. The input signal may be of a type which is verifiable by the information flow control means as originating in said first network.

Upon receipt of the downgrade request signal, indicator 34 will illuminate to indicate to the user that any information input to the input device eg mouse/keyboard configuration will be transferred to the less classified network 12. The switch means 20 will then direct the information received at port 30 from the user input device 32 to network 12 through port 28 and connection 24. In certain embodiments, this information may be also sent to network 10, either via a hardwired connection, or by echoing from Network 12. Clearly, if the downgrade request is not received, then the user may be confident that all information input via the user input device 32 is being transferred only to the more classified network 10, because indicator 34 is not lit.

A preferred embodiment of the information switch will be described later in the specification.

The information switch means of the embodiment described above depends on an incoming signal from the higher classified network to determine whether information entered by the input device 32 should be switched to the less classified network or not. It is not critical however that the incoming signal have a particular source since it could also be generated by a user operable hardwired switch eg actuation device 36, or an untrusted software application, which may be operable from either network.

Since it is important that the information switch operate in a trusted manner (ie in a manner which is resistant to all attempts to subvert its intended operation) the circuits within the information switch means (those depicted within the dotted lines) are preferably trusted. This requires that both hardware and software used in the information switch means are evaluated for trustworthiness and conform to standards recognised by those skilled in the art with regard to trusted functionality and resistance to various levels of external threat.

In one mode of operation it is an option to ensure that the information switch means 20 will maintain the indicator 34 extinguished as a default mode of operation. The user of the input device 32 will then always assume that information being input to the keyboard is intended for the more classified network. The reverse configuration could also be used by an operator aware of the significance of the indicator signal.

To initiate transfer of information via the input device to the less classified network may also require procedures in addition to or which are a substitute for those described above, such as for example a hard wired switch operable by the user (eg actuation device 36) or a predetermined signal via port 35 initiated from either of the networks.

The procedures involve a number of operations. However, in one form the more classified network workstation depicted as 38 in FIG. 4 may be operated in its normal manner which may include the use of a windows based GUI environment (for example XII or Microsoft Windows).

Upon the creation of a window for transferring information external of the more classified network an incoming signal via port 35 is sent to the information switch means 20. The creation of the window may be sufficient to initiate the incoming signal or the movement of a cursor into a window dedicated for this process may re-initialise the incoming signal.

The information switch means of the invention then operates to allow the flow of information from the user input device (eg keyboard) to the less classified network. In one embodiment, the less classified network may echo the information entered on the keyboard via the switch means to appear on the window opened on the workstation 38 in the more classified network. This does not violate the security of the more classified network. In another embodiment the information input via the user input device is also directed to the more classified network. In this later embodiment the trusted switch acts like a data T-junction when directing information to the less classified network.

FIG. 4 depicts an example of the abovementioned configuration showing an information processing means typically a workstation 38 located in the more classified network. Numerals identifying common elements in FIGS. 3 and 4 are provided.

The workstation located in the more classified network depicts a window 40 within which classified information is displayed and a further window 42 within which unclassified information is displayed.

Information in window 42 is supplied by the less classified network or is a result of simultaneous direction of the information input via the keyboard 32 to both networks. In this example the input signal used by the switch means to control the transfer of information from the keyboard 32 to the less classified network is provided by the workstation via port 35. This input signal controls the period of connection to the less classified network.

This type of dual window operation is sometimes referred to as a multi-level interactive session, where untrusted software requests a path between the workstation in the more classified network to the less classified network via the information switch means. The information switch means has total control of the information transmission to the less classified network. Conveniently then, the user has access to both networks. However, this also means that there is much more opportunity for users to improperly transfer information, either by accident or maliciously. Should this risk be evaluated as being too high, it is possible in some embodiments to record (in a trusted manner) all data leaving the switch via port 28. This method provides an audit trail if required.

In providing a multi-level interactive session, the workstation 38 is connected to the more classified network 10 and during normal operations, keyboard input is directed to the workstation 38. The information switch means is in an "idle" state simply transferring data from the keyboard 32 to the keyboard input 44 of the workstation 38.

When the user wants to begin a multi-level interactive session and thereby connect to a less classified network, the pointer on the workstation 38 is moved by the user into a window created to display information obtained whilst interacting with the less classified network, or into another predefined region of the screen.

A signal from the workstation 38 to input 35 is provided from an untrusted process running on the workstation to the information switch means to indicate that a multi-level interactive session to a less classified network is required.

The signal as mentioned previously can originate elsewhere and may take many forms. FIG. 4 depicts ports 35 and 46 as separate information ports but they could also be configured as a single bidirectional port.

The information switch means upon receipt of the signal, may preferably stop transferring keyboard data to the more classified network, and starts sending subsequent keyboard data to the less classified network. Connection 24 may represent any medium for example a serial, SCSI, or ethernet communications medium. The data diode 23 and its connections are not shown since they can be made separately from the trusted switch means 20 which will avoid double wiring as well. Data flow from the higher classified network to the lower classified network is prevented by data diode 23 as depicted in FIG. 3. The information received on the input line (which may be a serial line) is typically displayed in the unclassified window 42 of the workstation 38.

When the mouse connected to the workstation 38 is moved from window 42, the information switch means is signalled and then immediately directs any keyboard information entered to the keyboard input 44 of the workstation 38 where the normal GUI will direct it into window 40 of the workstation. In another embodiment a session manager will handle the signalling of the information switch means. In this later configuration the mouse connected to the workstation 38 may be moved out of and back into window 42 without returning the switch to "idle" mode. The user will explicitly request the session manager to signal the information switch to direct keyboard information entered to the keyboard input 44 of the workstation 38 where the normal GUI will direct it into window 40 of the workstation. The format of the signal may take many forms eg a voltage which has been provided is removed, a coded string of data is transmitted, etc.

More importantly, while information is being directed by the information switch from the keyboard to the less classified network 12 the indicator 34 is lit thereby unambiguously indicating to the user that any information typed by them will be transferred to the less classified network.

In this way, the only information which can be transmitted to the less classified network is that which has been typed directly onto the keyboard while the indicator 34 is operated.

It is preferable that the keyboard be such that any onboard memory devices thereon are reset before the information switch directs keyboard input to the less classified network. This eliminates the opportunity for keystrokes entered during input to the more classified network being stored in full or in a compressed form and then being sent to the less classified network with keyboard entry during the time the information switch is configured to allow this. This type of operation requires that there be signals generated by the information switch means which have been communicated to the keyboard prior to operating the information switches to allow the transfer of information from the keyboard to the less classified network.

As a matter of convenience any information which is displayed on the less classified window may be cut or copied, and then pasted into another window as is standard for a GUI environment; but the reverse is not allowed.

One threat in this example is the occurrence of a request signal from the workstation 38 to the information switch means indicating that there is a request for a multi-level interactive session which is not coincident in time with the opening of a window 42 but rather with a window like 40. The user may be at that time be typing classified information which should not be transferred into the less classified network.

To lessen this threat the indicator is designed to always operate if the information switch is configured so as to provide information to the less classified network.

A further means of lessening the abovementioned threat is to employ an "accept button" which works in conjunction with the indicator means. The accept button has been previously depicted as actuation device 36.

Upon the requesting signal from the workstation 38 being sent to and received by the information switch means 20 (recognising that this is an untrusted process) it enters a "pending" state, in which the indicator lamp flashes. When the workstation user observes this, the user will be required to actuate the "accept" button 36. Consequently the lamp is illuminated in a continuous fashion, thereby indicating that information entered on the keyboard will be transferred to the less classified network. At all other times the information switch is configured to transfer information entered on the keyboard to the more classified network. In a preferred embodiment the information switch is a trusted device and the actuation of the lamp and the receipt of the "accept button" input are designed to be provably reliable and secure.

A request to reset the switch to its original position may result from movement of the pointer outside window 42 to another window 40 or anywhere else on the screen. In other embodiments the downgrade request may be controlled by a session manager running on workstation 38. The manager will signal the switch to return to "idle" mode, where the indicator lamp 34 will turn off and keyboard information will then only be provided to the workstation 38 in the more classified network 10.

The information switch means 20 depicted in FIG. 4 must be a trusted device to successfully implement the abovementioned procedures and one preferred embodiment is depicted in FIG. 3. Each element depicted within the boundary of the dotted line is a trusted element as is the combination.

As described previously, an input signal via port 35 is generated by the untrusted software or hardware in the workstation 38 located in the more classified network 10 which is received by the controller 37. The controller is preferably a finite state automation but it may be implemented in many other ways. Obviously, the simpler the implementation the easier it will be for that portion of the information switch means to be evaluated for trustworthiness to the requisite level.

Figure 9:
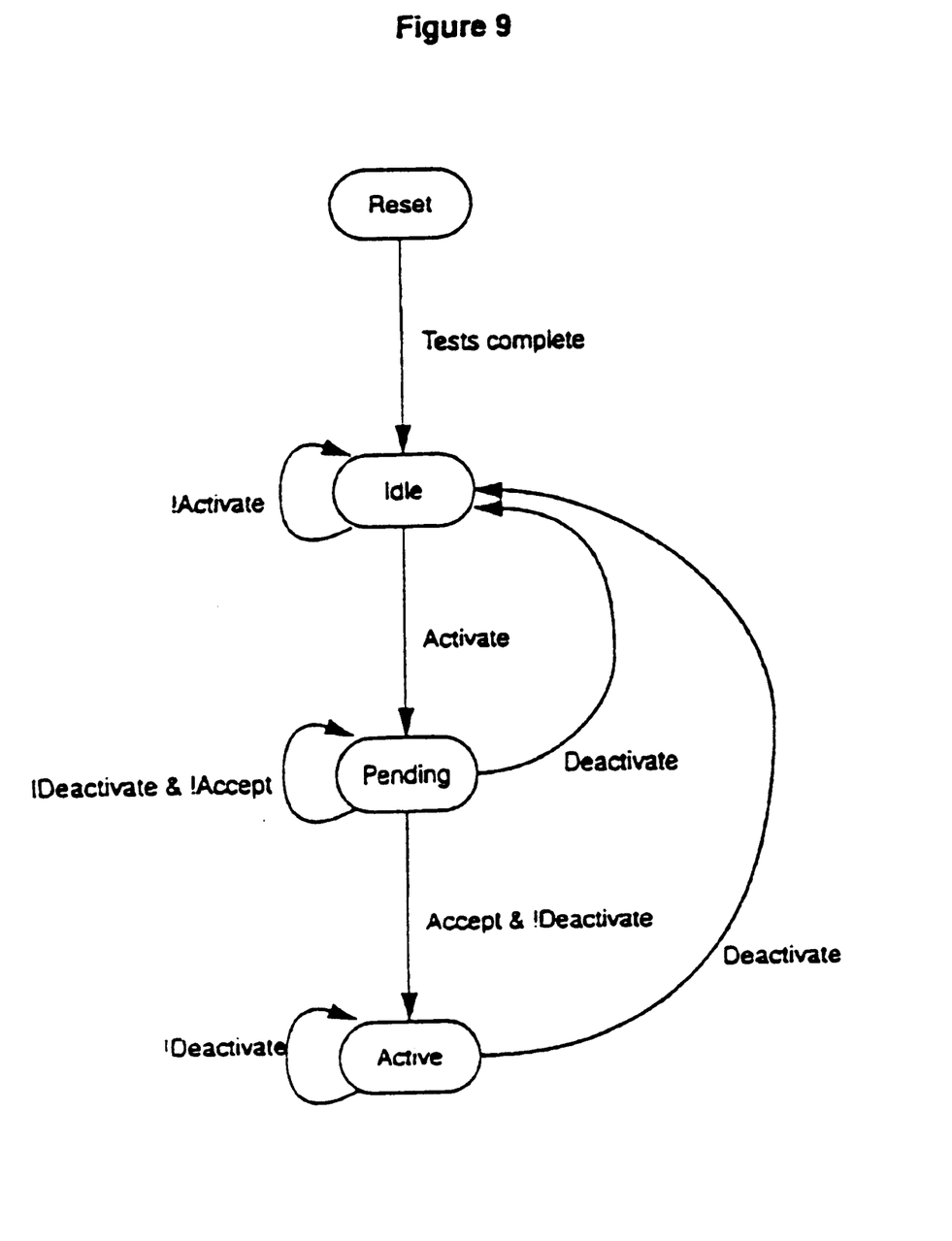
FIG. 9 depicts a state diagram of the operation of an information flow control device of the invention.

One possible set of states of the controller 37 for a multi-level interactive session which conform with the description provided above is depicted in FIG. 9.

In the "idle" state, the information switch passes user input only to the first network 10. No output is seen at the second network 12. When a switch request is received by the trusted switch 20, the switch will enter the "pending" state, which indicates to the user via the indicator means 34 that a switch request has been issued. The user may then activate the acceptor means 36 to confirm that the request is valid, the switch 20 will then enter the "active" state which allows the transfer of information from the keyboard to network 12.

No write access is permitted to network 12 until the acceptor has been activated. No data flows from network 10 to network 12 take place unless the user explicitly enters them using the data input device. However, data from network 12 is permitted to enter network 10.

At all times during transfer of information to network 12, the indicator will indicate to the user that information is being transferred to network 12. If at any time the request signal is removed, the switch 20 and indicator 34 will revert to their respective "idle" modes.

Whilst it is recognised that the invention is not based on any particular input or display technology, and the number of connected networks is in no way limited, it will be recognised that there are many variations of connection topology that are possible using the invention.

Figure 5:
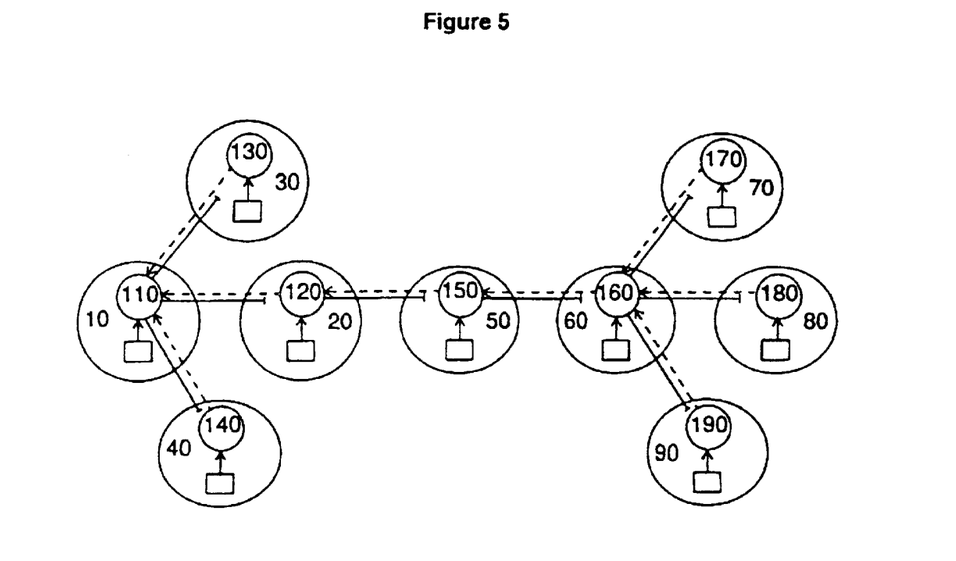
FIG. 5 depicts a network topology usable by the invention.

FIG. 5 depicts a pictorial representation of a plurality of information flow control means 110, 120, 130, 140, 150, 160, 170, 180 and 190 in respective networks 10, 20, 30, 40, 50, 60, 70, 80 and 90. Each flow control means can have as depicted two or more outputs such that, for example, information input to flow control means 110 may be directed to either network 10, 20, 30 or 40 as depicted by the solid lines which terminate within the network not at a flow control means while information may transfer from any of networks 20, 30 or 40 into network 10 as depicted by the broken lines.

Further, the flow control means 160 in network 60 has outputs to networks 150, 170, 180 and 190 while information may transfer from any of the networks 70, 80 and 90 to 60 and/or 70 dependent on how the output from the information diode is directed.

Figure 6:
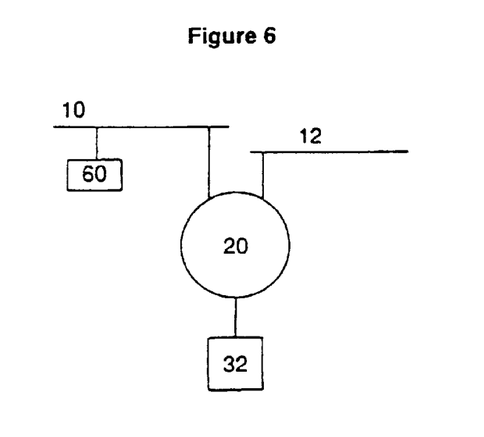
FIG. 6 depicts a pictorial representation of a network interconnection using the invention.

FIG. 6 depicts a pictorial representation of an untrusted workstation 60 connected in a trusted or physically secure manner to a more classified network 10 which itself is connected to a first output of the switch means of an information flow control means 20 having an input device 32 and also connected via a second output of the switch means to a second less classified network 12.

Figure 7:
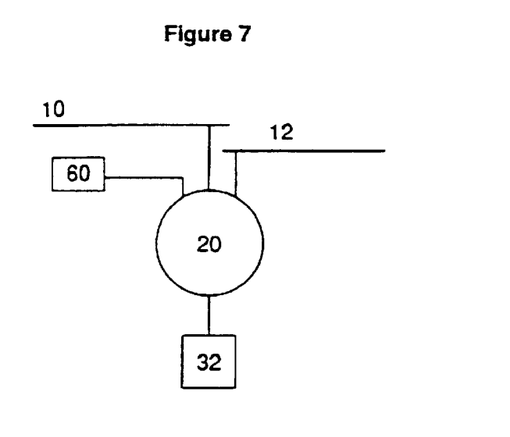
FIG. 7 depicts a pictorial representation of a network interconnection using the invention.

FIG. 7 depicts a pictorial representation of a workstation 60 connected to one output of the switch means of an information flow control means 20 having an input device 32 and also connected via a second output of the switch means to a more classified network 10 as well as having a third output of the switch means connected to a less classified network 10 and the information diode output connected as required to allow the less classified network to connect to either or both the workstation and the more classified network. The workstation 60 being an example of an information processing means may be connected to the respective output of the switch means by wire or wireless means. The workstation is located within the more classified network 10 and hence there may exist a requirement for the wire or wireless connection to be trusted.

Figure 8:
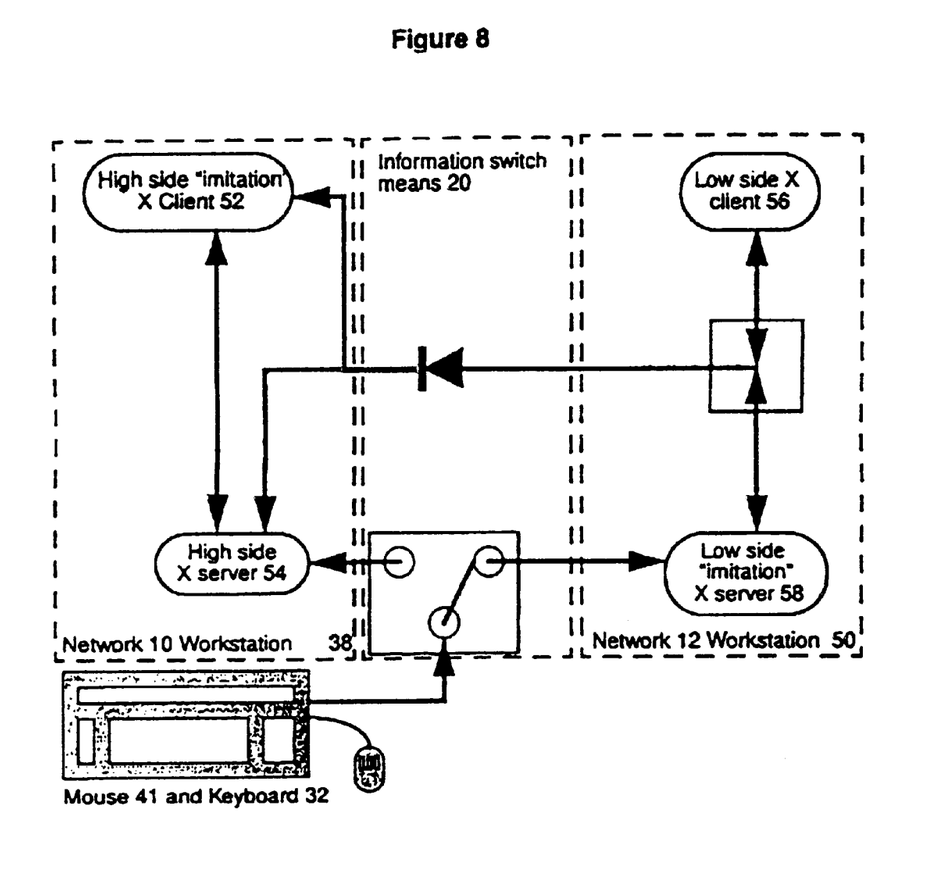
FIG. 8 depicts the invention being used in a X server/client environment between networks having different security levels.

The following embodiment describes a terminal-like session using a GUI based workstation environment as depicted pictorially in FIG. 8.

As an example, consider the case where the mouse pointer enters the window 42 (refer also to FIG. 4), triggering a XCrossingEvent (XEnterWindowEvent) or a XFocusChangeEvent (XFocusInEvent). A callback set on the window widget could write a specific sequence to the switch via the second input 46. This shifts the information switch to "pending" state. As before, a lamp flashes during the "pending" state, requiring user action. If the mouse pointer is moved out of window 42 before an "accept" button was activated, the request is negated (for example via a callback set on a XLeaveWindowEvent or a XFocusOutEvent) and no data would be transferred to the less classified network. At this point, the indicator will indicate that the information switch has moved back to its "idle" state. Otherwise, after the accept button is pressed, user input data is transferred to the less classified network while the information switch is in its "active" state.

The less classified network access may be implemented as simply as a text based remote login session. The less classified network output is sent to the more classified network input, where the terminal (ie window) manager is responsible for handling the display of this information. User input such as mouse movements are also sent to the more classified host device to be interpreted by the window manager. In this embodiment acknowledgements from the more classified network window manager to the less classified network are not allowed.

As it is simple to show that if no data moves from the more classified to less classified network, the display manager and associated hardware and software can be untrusted. The indicator provides a visual cue that the manager has correctly issued the XLeaveWindowEvent/XFocusOutEvent callbacks, so even a trojan horse in the display manager will not compromise data confidentiality.

Some X based software requires X protocol responses from the X server to the X client. The above description does not permit this to occur, additional software support is therefore required.

FIG. 8 depicts the software architecture and data flows necessary to support an X application running on the less classified network/s in this embodiment on the less classified workstation 50 and connected to an X server on the more classified network and workstation 38. This method of dealing with the acknowledgement problem is applicable to other types of windowing systems.

The X client may be located anywhere within the less classified network or any connected network.

X applications may require a large amount of information from X servers in the form of X events and replies to requests.

These replies consist of X server state information and information pertaining to X resources available on the X server. This information cannot flow from the more classified to less classified network/s. In order for the X application (client) 56 running on the less classified workstation to receive this information an "imitation" X server 58 running on the less classified workstation 50 is used to provide this information.

When the switch means is in its active state, user input is sent to both the more classified network 10 and the less classified network 12 this is understood to be a T-junction configuration and a different arrangement user input may be echoed from the low side network. This will allow the X server 54 on workstation 38 to control the display in response to the input, and the imitation X server 58 on workstation 50 to mirror all X events that are generated. The client application on workstation 50 will receive X events from the imitation X server 58 so data including event data does not flow from the more classified to less classified network.

X protocol requests from the X application 56 on workstation 50 are simultaneously sent to X server 54 on workstation 38 and the imitation X server 58. Display commands will be executed correctly by the X server on workstation 38. The imitation X server will likewise execute these display commands on a logical screen ensuring that the X server environment is mirrored. Requests requiring replies will be handled by the imitation X server with the replies being directed to the X application 56 on workstation 50. The replies may be simultaneously directed to the imitation X client 52 on workstation 38.

The X server on the more classified workstation 38 will receive all input and generate X events. When the input, and hence X events, are related to X applications 56 on the less classified workstation the X events are directed to an imitation client 52 on the more classified workstation. The imitation client may simply ignore these X events. The imitation client may also process X requests from the X application on the less classified workstation. For example, imitation client translates window identifiers for the imitation X server 58 to window identifiers for X server 54. The X protocol requests, once translated, are then passed on to X server 54. Replies to requests from the X server running on the more classified workstation are captured by the imitation client (which again, may ignore or process them).

Depending on the applications running on the networks, it may be necessary to add other hardware and software such as input filters (for example, to filter out mouse commands sent to a text based terminal) and session managers to initiate and maintain a session, and hardware to handle the inputs and output ports, or to interpret a sequence as a switch request. So long as this hardware and software cannot interfere with the action of the information switch means, the other hardware and software can be untrusted, since no data will be permitted to flow from the more classified to the less classified network.

An example of this type of operation may be a "telnet" style session manager. This could be created when the information switch is in the reset state, as an untrusted process which initiates and maintains a telnet session on the less classified network host. This simple, untrusted software could handle the necessary handshaking required by the network protocol (such as header construction, removal and addressing). In fact the session manager might even be implemented in simple hardware.

Meanwhile, the same "reset" state would cause an X window to appear on the desktop, and direct the output from the less classified network window there. This approach has the advantage of allowing a "cut-and-paste" operation to be performed from the less classified to the more classified network, since the window manager treats the less classified window in the same way as any other terminal session, although the reverse operation is of course impossible, since only information entered through the user entry device can ever be transferred to the less classified network.

A real threat in this implementation is the failure of the indicator(s). For this reason, the indicators should be tested during the "reset" state. Multiple indicators are also possible—eg an indicator could be made to operate during "idle" and "pending" states, indicating those states of operation. Another possible implementation is to use the indicator to indicate the "safe" state, and when there is no indication, an "unsafe" state is indicated. (This is a "fail safe" mode of operation).

Figure 10:
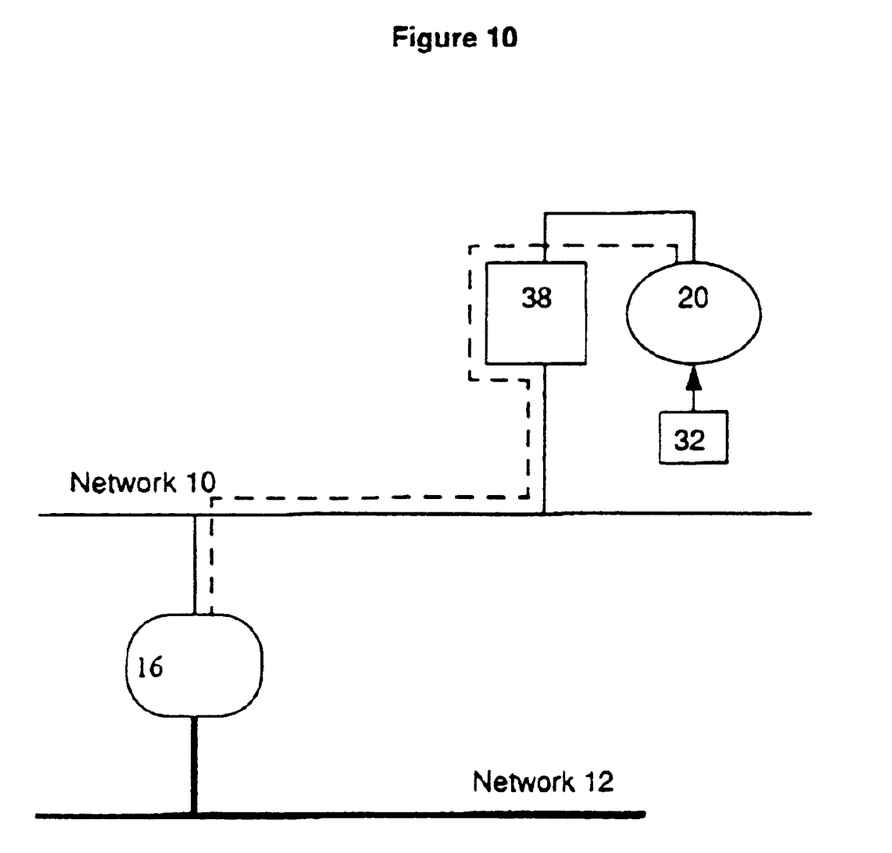
FIG. 10 depicts a pictorial representation of a network interconnection using the invention.

FIG. 10 depicts a logical connection of the information flow control device 20 to the less classified network which for a portion of the communications medium is a part of the more classified network. Information may only pass through this logical connection and leave the more classified (high side) network if the information is appropriately sealed, signed or transformed in an appropriate trusted manner which is preferably performed in the information flow control device itself.

Figure 11:
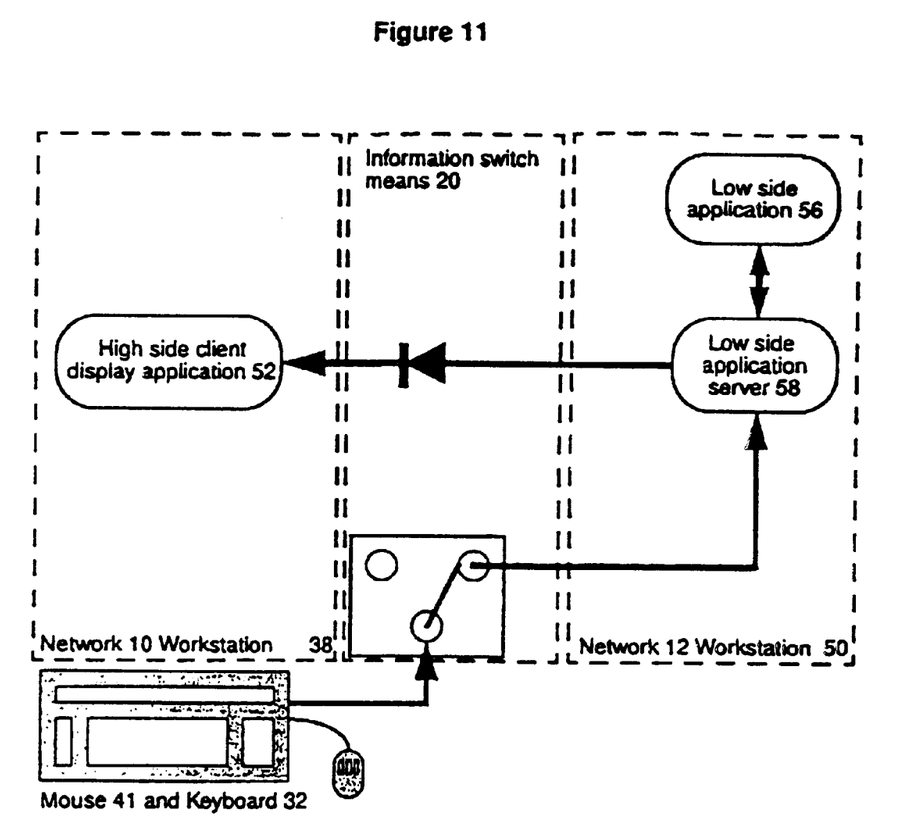
FIG. 11 depicts the invention being used for remote display application between networks having different security levels.

FIG. 11 depicts a remote application session using a remote display protocol which allows a user in a more classified network 10 to run an application 56 on an information processing means (eg workstation 50) in the less classified network 12 while displaying the results of the session on the information processing means (eg workstation 38) in the more classified network 10.

To do so the information switch is placed into the "active" state and the user inputs information via their mouse 41 and keyboard 32 to the less classified network 12 which is received by the application server 58 operating the application session 56 on workstation 50 and redirected to the low side application 56.

The application server 58 intercepts the low side application display commands which would otherwise have been used to drive a local display or one within the less classified network 12 and directs those commands to the high side client display application 52 through the data diode using an appropriate remote display protocol.

The previously described X-Window example is applicable to the configuration embodiment provided in FIG. 11 but the use of this configuration is not limited to GUI's and remote protocols of the X Windows System.

DESCRIPTION OF A FURTHER EMBODIMENT OF THE INFORMATION SWITCH

The information switch can be described using four states of state-machine, having a "reset" state which returns the state machine to "idle".

TABLE 1

| | State machine state description |
|---|---|
| Reset: | Perform any required initialisation. Lamp is off |
| Idle: | Lamp is off. Data is transferred from keyboard to host |
| Pending: | Lamp is flashing. Keyboard is "connected" to host. |
| Active: | Lamp is on. Keyboard is connected to remote. |

FIG. 9 and Table 1 above show that:

State 0: Reset: This is an initialisation state which performs any required setup and tests. A transition to idle occurs if the self test indicates correct operation.

State 1: Idle: The switch is in its "safe" state. All input from the keyboard is transferred directly to the display/more classified network. No data is output to the less classified network. The indicator shows the "idle" state, and the "accept" button is ignored. If a downgrade request is received (an activate event), the state-machine changes to the "pending" state. Data may flow from the less classified network to the more classified network.

State 2: Pending: The information switch is waiting for the "accept" signal input. The indicator displays to the user this state by prompting a response. If an accept event occurs before the request disappears (a deactivate event) then the state machine changes state to the "active" state. If a deactivate event occurs, the machine will return to the "idle" state. Otherwise, it will remain in the "pending" state. During the "pending" state, all input from the keyboard is transferred directly to the display/more classified network. No data is transferred to the less classified network. Data may flow from the less classified network to the more classified network.

State 3: Active: Input from the keyboard is transferred to the less classified network. In one embodiment the data returned from the less classified network is echoed to the more classified network. The indicator must clearly indicate and warn the user that all keyboard input will be transferred to the less classified network. When a deactivate event occurs, the machine changes state to the "idle" state. Data may flow from the less classified network to the more classified network.

Various figures depict switch 48 as a double pole single throw switch having a first pole connected to the keyboard 32 which switches the input from the keyboard to either the more classified network 10 or to the less classified network 12.

If switch 48 is mechanical it is preferably biased so that the first pole is normally switched to the pole connected to the more classified network.

In a switch having more than two outputs the position of the switch 48 is controlled by the controller 37 in accord with the allowable states of the state-machine in the controller.

It will be appreciated by those skilled in the art, that the invention is not restricted in its use to the particular application described and neither is the present invention restricted in its preferred embodiment with regards to the particular elements and/or features described herein. It will be appreciated that various modifications can be made without departing from the principles of the invention, therefore, the invention should be understood to include all such modifications within its scope.

The claims defining the invention are as follows:

1. A means to control information flow between a first and second computer network where said first network has a higher security classification than said second network, the flow control means comprising
    an information switch having
       an information input,
       a first output connected to said first network,
       a second output connected to said second network,
    a controller having at least two states a first state controlling said information switch to connect said input to said first output and a second state controlling said information switch to connect said input to said second output, and
    an information diode having an input for receiving information from said second network and an output for transferring information received from said second network to said first network through a connection from said information diode output to said first network and which prevents information flowing from said output to said input.

2. An information flow control arrangement according to claim 1 wherein said controller is in said first state unless said controller is forced into said second state.

3. An information flow control arrangement according to claim 2 further comprising
    an indicator means for indicating the state of said controller to a user of said information flow control means.

4. An information flow control arrangement according to claim 3 wherein said indicator means is visible or audible or tactile to a user of said flow control means.

5. An information flow control arrangement according to claim 1 wherein said controller's said second state controls said information switch to connect said input to both said first output and said second output.

6. An information flow control arrangement according to claim 1 wherein said controller is trusted.

7. An information flow control arrangement according to claim 1 wherein said controller further comprises a request signal input and is forced into said second state when a request signal is received at said request signal input.

8. An information flow control arrangement according to claim 7 wherein said first network provides a request signal input.

9. An information flow control arrangement according to claim 7 wherein said request signal is provided by a user operable switch which is physically associated with said information flow controller and adapted to be operable only by the user of said information flow control means.

10. An information flow control arrangement according to claim 9 wherein said controller is not forced into said second state unless said user by operation of said user operable switch verifies said request signal is provided by said first network.

11. An information flow control arrangement according to claim 1 wherein said information input is information generated by at least one user operable input device.

12. An information flow control arrangement according to claim 1 wherein said information switch further comprises at least one further output connected to a respective further network and said controller having further states for controlling said information switch to connect said input to a respective further output.

13. An information flow control arrangement according to claim 1 wherein said information output from said first output is provided to said first network which further comprises an information sealing means for associating an unique seal with said information output from said first output and communicating said sealed information within said first network.

14. An information flow control arrangement according to claim 13 wherein said information sealing means is trusted.

15. An information flow control arrangement according to claim 14 wherein said trusted information sealing means is physically associated with said flow control means.

16. An information flow control arrangement according to claim 15 wherein said first network further comprises a gateway means for communicating information from said first network only when said information is associated with a unique seal associated to it by said information sealing means.

17. An information flow control arrangement according to claim 16 wherein said gateway means is trusted.

18. An information flow control arrangement according to claim 1 wherein said information output from said first output is provided to said first network which further comprises an information digital signature means for associating an unique digital signature with said information output from said first output and communicating said signed information within said first network.

19. An information flow control arrangement according to claim 18 wherein said information digital signature means is trusted.

20. An information flow control arrangement according to claim 19 wherein said trusted information digital signature means is physically associated with said flow control means.

21. An information flow control arrangement according to claim 18 wherein said first network further comprises a gateway means for communicating information from said first network only when said information is associated with a unique digital signature associated to it by said digital signature means.

22. An information flow control arrangement according to claim 18 wherein said gateway means is trusted.

23. An information flow control arrangement according to claim 1 wherein said first network has an information processing means operating a high side client display application, and said second network has an information processing means operating an application server and using a remote display protocol, whereby remote display commands are communicated to said first network information processing means through said information diode, such that when said information switch controller is in said second state, said information input is connected to said low side application server, and low side application server communicates to said high side client display application through said information diode.

24. An information flow control arrangement according to claim 23 wherein said first network information processing means has a multi tasking operating system and said second network information processing means has a multi tasking operating system.

25. An information flow control arrangement according to claim 23 wherein said first network information processing means has a single tasking operating system and said second network information processing means has a multi tasking operating system.

26. An information flow control arrangement according to claim 23 wherein said first network information processing means has a multi tasking operating system and said second network information processing means has a single tasking operating system.

27. An information flow control arrangement according to claim 23 wherein said first network information processing means has a single tasking operating system and said second network information processing means has a single tasking operating system.

28. An information flow control arrangement according to claim 1 wherein said first network has a high side X server and a high side imitation X server, and said second network has a low side imitation X server and a low side X client such that when said information switch controller is in said second state, said information input is connected to said low side imitation X server, and the imitation X server communicates with said low side client and with said high side imitation X client through said information diode; and said low side X client sends information to both said low side imitation X server and said high side imitation X client and said high side X server through said information diode which both then communicate with each other to provide a secure X environment for information received by said input.

29. An information flow control arrangement for location between a first and second computer network where said first network has a higher security classification than said second network and said first network having at least one information processing means therein, said flow control means comprising an information switch having
 an information input,
 a first output connected to a said at least one information processing means within said first network,
 a second output connected to said second network,
a controller having at least two states a first state controlling said information switch to connect said input to said first output and a second state controlling said information switch to connect said input to said second output, and an information diode having an input for receiving information from said second network and an output for transferring information from said second network to said at least one information processing means through a connection from said information diode output to said first network and which prevents information flowing from said output to said input.

30. An information flow control arrangement according to claim 29 wherein said controller is in said first state unless it is forced into said second state.

31. An information flow control arrangement according to claim 30 further comprising an indicator means for indicating the state of said controller to a user of said information flow control means.

32. An information flow control arrangement according to claim 31 wherein said indicator means is visible or audible or tactile to a user of said flow control means.

33. An information flow control arrangement according to claim 29 wherein said controller is trusted.

34. An information flow control arrangement according to claim 29 wherein said controller further comprises a request signal input and is forced into said second state when a request signal is received at said request signal input.

35. An information flow control arrangement according to claim 34 wherein said first network provides a request signal input to said controller request signal input.

36. An information flow control arrangement according to claim 35 wherein said request signal is verifiable as being provided by said first network.

37. An information flow control arrangement according to claim 34 wherein said request signal is provided by a user operable switch which is physically associated with said information flow controller and adapted to be operable only by the user of said information flow control means.

38. An information flow control arrangement according to claim 29 wherein said information input is information generated by at least one user operable input device.

39. An information flow control arrangement according to claim 29 wherein said information switch further comprises at least one further outer connected to a respective network and said controller having further states for controlling said information switch to connect said input to a respective further output.

40. An information flow control arrangement according to claim 29 wherein said information output from said first output is provided to said first network which further comprises an information sealing means for associating an unique seal with said information output from said first output and communicating said sealed information within said first network.

41. An information flow control arrangement according to claim 40 wherein said information sealing means is trusted.

42. An information flow control arrangement according to claim 41 wherein said trusted information sealing means is physically associated with said flow control means.

43. An information flow control arrangement according to claim 40 wherein said first network further comprises a gateway means for communicating information from said first network only when said information is associated with a unique seal associated to it by said information sealing means.

44. An information flow control arrangement according to claim 43 wherein said gateway means is trusted.

45. An information flow control arrangement according to claim 29 wherein said information output from said first output is provided to said information processing means which further comprises an information digital signature means for associating an unique digital signature with said information output from said first output and communicating said signed information within said first network.

46. An information flow control arrangement according to claim 45 wherein said information digital signature means is trusted.

47. An information flow control arrangement according to claim 46 wherein said trusted information digital signature means is physically associated with said flow control means.

48. An information flow control arrangement according to claim 45 wherein said first network further comprises a gateway means for communicating information from said first network only when said information is associated with a unique digital signature associated to it by said digital signature means.

49. An information flow control arrangement according to claim 48 wherein said gateway means is trusted.

50. An information flow control arrangement located between a first and second computer network where said first network has a higher security classification than said second network and at least one information processing means external of both said first or second networks, said flow control means comprising an information switch having
an information input,
and at least three outputs,
a first output connected to said first network,
a second output connected to said second network,
a third output connected to said information processing means,
a controller having at least three states, a first state controlling said information switch to connect said input to said first output,
a second state controlling said information switch to connect said input to said second output, and
a third state controlling said information switch to connect said input to said third output, and
an information diode having an input for receiving information from said second network and an output for transferring information from said second network to said first network and/or to said information processing means.

51. An information flow control arrangement according to claim 50 wherein said controller is in said first state unless it is forced into another state.

52. An information flow control arrangement according to claim 51 further comprising
an indicator means for indicating the state of said controller to a user of said information flow control means.

53. An information flow control arrangement according to claim 52 wherein said indicator means is visible or audible or tactile to a user of said flow control means.

54. An information flow control arrangement according to claim 50 wherein said controller is trusted.

55. An information flow control arrangement according to claim 50 wherein said controller further comprises a request signal input and is forced into said second state when a request signal is received at said request signal input.

56. An information flow control arrangement according to claim 55 wherein said first network or said information processing means provides a request signal input to said controller request signal input.

57. An information flow control arrangement according to claim 56 wherein said request signal is verifiable as being provided respectively by said first network or said information processing means.

58. An information flow control arrangement according to claim 55 wherein said request signal is provided by a user operable switch which is physically associated with said information flow controller and adapted to be operable only by the user of said information flow control means.

59. An information flow control arrangement according to claim 50 wherein said information input is information generated by at least one user operable input device.

60. An information flow control arrangement according to claim 50 wherein said information switch further comprises at least one further output connected to a respective network and said controller having further states for controlling said information switch to connect said input to a respective further output.

61. An information flow control arrangement according to claim 50 wherein said information output from said first output is provided to said first network which further comprises an information sealing means for associating an unique seal with said information output from said first output and communicating said sealed information within said first network.

62. An information flow control arrangement according to claim 61 wherein said information sealing means is trusted.

63. An information flow control arrangement according to claim 62 wherein said trusted information sealing means is physically associated with said flow control means.

64. An information flow control arrangement according to claim 61 wherein said first network further comprises a gateway means for communicating information from said first network only when said information is associated with a unique seal associated to it by said information sealing means.

65. An information flow control arrangement according to claim 64 wherein said gateway means is trusted.

66. An information flow control arrangement according to claim 50 wherein said information output from said first output is provided to said information processing means which further comprises an information digital signature means for associating an unique digital signature with said information output from said first output and communicating said signed information within said first network.

67. An information flow control arrangement according to claim 66 wherein said information digital signature means is trusted.

68. An information flow control arrangement according to claim 67 wherein said trusted information digital signature means is physically associated with said flow control means.

69. An information flow control arrangement according to claim 68 wherein said first network further comprises a gateway means for communicating information from said first network only when said information is associated with a unique digital signature associated to it by said digital signature means.

70. An information flow control arrangement according to claim 69 wherein said gateway means is trusted.

71. An information flow control arrangement according to one of claims 1, 29 or 50 wherein said controller further comprises a reset means for forcing said information switch into said first state.

72. An information flow control arrangement according to claim 71 wherein if power is lost to said information switch means said controller enters said reset state upon resumption of power.

73. An information flow control arrangement according to one of claims 1, 29 or 50 wherein data output from said second output is audited.

* * * * *